Patented Aug. 17, 1937

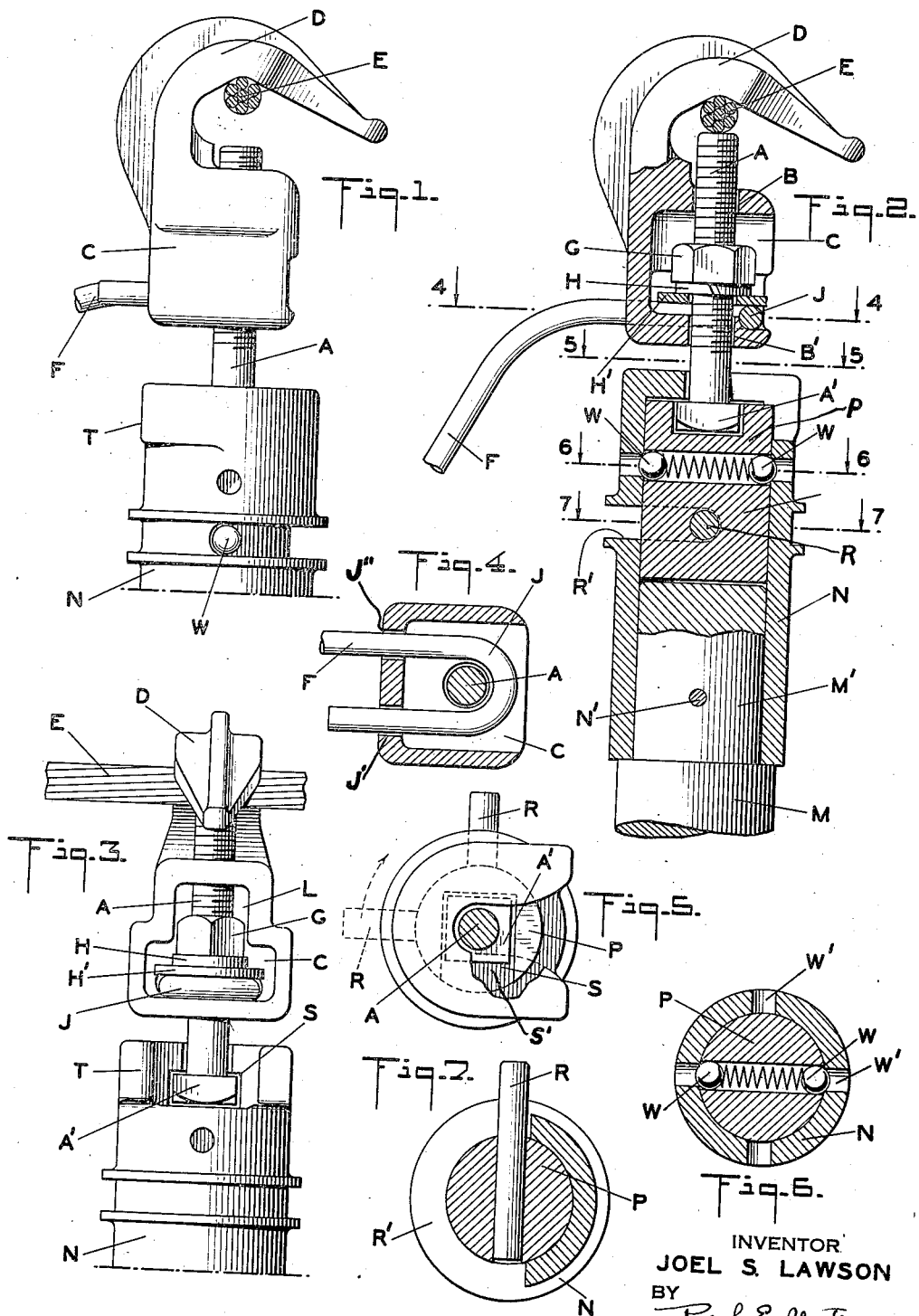

2,090,134

UNITED STATES PATENT OFFICE 2,090,134

APPLIANCE FOR CONNECTING AND DISCONNECTING SECONDARY TAP LINES TO POWER CIRCUITS

Joel S. Lawson, St. James, N. Y.

Application May 15, 1934, Serial No. 725,759

2 Claims. (Cl. 173—273)

This invention relates to electric power distribution and more especially to appliances for safely connecting and disconnecting secondary tap lines to and from high tension power circuits.

An object of the invention is to provide a simplified arrangement for producing an effective electrical circuit between high tension power and secondary lead or tap lines.

Appliances for connecting leads to power lines because of the high potential ordinarily employed for economical transmission require a power line clamp which can be manipulated without coming within dangerous proximity to the power line and an especially good contact of the tap lead with the power line clamp to prevent arcing. In an effort to obtain a good contact, the leads have heretofore been held in place on the customary hook shaped jaw of the line clamp by special clamping plates or inserted in specially drilled sleeves and held in place by set screws. In the present invention, instead of providing special arrangements on the hook for securing the tap wire in place, the end of the tap wire is clamped down by one of the members of the line clamp. In the preferred embodiment of the invention illustrated in the drawing, this takes the form of a conventional nut and bolt, the nut serving not only to feed the bolt, but also to clamp the end of the lead line against a stationary part of the device when further travel of the bolt is arrested by the line clamps reaching operative line gripping position. The loose arrangement of the nut and bolt except when in line gripping position, simplifies the construction and facilitates assembly.

The power line clamp construction illustrated can be manipulated by various types of reach poles and held in place by various end locks, the illustrated embodiment shown in the drawing, admirably serves the purpose.

While one embodiment of the invention is shown in the drawing accompanying this specification and forming part thereof, it is to be understood that such embodiment is merely illustrative of the underlying principles of the invention so as to afford a clear understanding thereof to those skilled in the art and is not intended as limiting the invention to the specific form disclosed therein.

In said drawing:

Fig. 1 is a side elevation of the invention showing the clamp in preliminary position for engaging the power line.

Fig. 2 is a partly vertical section of the invention showing the device line in clamping position.

Fig. 3 is a front elevation.

Fig. 4 is a section of Fig. 2 on the line 4—4.

Fig. 5 is a section of Fig. 2 on the line 5—5, partly broken away.

Fig. 6 is a section of Fig. 2 on the line 6—6, and

Fig. 7 is a section of Fig. 2 on the line 7—7.

Continuing now by way of a more detailed description, a preferably conventional bolt A having a bolt head A' is slidably supported in openings B and B', formed in the top and bottom walls of a housing C which is preferably cast with a power line engaging hook end D. This hook end is adapted to be raised on the end of a reach pole and swung over a line wire E, the down pull of the reach pole preventing the hook from rotating relatively to the line wire E and permitting the bolt A to be rotated relatively thereto in a manner to be more fully described hereinafter. In order to provide a non-arcing electrical connection between the power line wire E and a lead wire F a nut G is threaded on the bolt A within the housing C and bears preferably against a lock washer H which in turn bears on a washer H' resting on the looped end J of the lead wire F. The loop J rests on the bottom of the housing C and is passed through suitable openings J' and J'' drilled or otherwise formed in the housing C. As the bolt head A' is rotated by any suitable manipulating tool for instance by the reach pole shown in the drawing, the bolt A is screwed upwardly through the nut G which is prevented from turning because of the keying or anchoring action of the restricted polyhedric nut guide or seat found in the upper portion of the housing C. The inside lower portion of the housing is of larger cross section than the upper to accommodate a heavy cable for the tap line with a comparatively small nut and bolt as will be readily understood. While the upper end of the bolt is shown in the preferred embodiment as directly engaging the line wire, it is evident that an auxiliary power line engaging member might be moved by the bolt into gripping position with the line wire. As travel of the bolt is arrested, either directly by engaging the line wire E or by some auxiliary member engaging the line wire as indicated, the nut G on continued rotation of the bolt is fed downwardly thereby pressing the lock washer H firmly against the washer H' and loop J of the lead wire F and establishing an efficient contact with the tap line and power line.

In the foregoing construction it will be noted the nut not only serves to feed the bolt to clamp the line wire, but also serves to move the washer downwardly and to effectively clamp the end of the lead wire in place.

In assembling the line clamp elements, the bolt A is passed through the lower opening in the housing C, the nut lock washer H and washer H' placed within the housing and the nut threaded on the bolt, the bolt end being passed through the top opening of the housing. The tap wire is passed through opening J', below the washer, looped around the shank of the bolt and passed through opening J". When the bolt is rotated it is fed upwardly until its travel is arrested. Further rotation feeds the nut and washer downwardly clamping the looped end of the tap wire as heretofore indicated.

While any suitable tool may be used to rotate the bolt, the present line clamp is more particularly designed for use with high tension wires and in order to obviate danger to the linemen, the clamp is generally detachably supported on the end of a reach pole to which it is preferably locked. While the present end construction of the reach pole is not the only one which can be used, it affords a simplified construction for locking with a bolt head of the type shown.

In the specific construction illustrated, the reach pole M has a reduced end M' to receive the sleeve N to which it is secured by a pin N'. A rotatable bolt head receiving block P journalled in the sleeve has a projecting manually operable pin R riding in a guide slot R' formed in the sleeve N by means of which the block can be rotated relatively to the sleeve.

The upper end of the rotatable block has a bolt head receiving recess S, one side of the recess being open and on rotation adapted to register with a cut-away portion S' on one side of the flanged bolt head retaining collar T. In order to lock the bolt head A' of the line clamp jaw to the reach pole, the open side of the bolt head receiving recess of the block P is brought into registry with the other side of the bolt head retaining collar. The bolt head is slid into the opening in the collar T and seated in the block P which is then rotated. The block is held in position by spring-pressed bearings W engaging recesses W' in the collar end. The open side of the block is closed off by the collar and the bolt head thereby retained in place.

It is claimed:

1. In a device of the character described, a single hook adapted to be engaged over one side of a line wire, a hollow housing formed on the shank of the hook and having a side opening, a bolt slidably supported in aligned openings in said housing and adapted to engage the opposite side of the line wire to that engaged by the hook, a nut threaded on the bolt to feed the latter toward the line wire, the nut being longitudinally slidable in the housing and anchored against rotation by certain of the walls thereof, and an abutment formed at an edge of the opening to receive a tap wire to be clamped against the abutment by the nut.

2. The device as set forth in claim 1, wherein a lock means is cooperative with the bolt and nut within the said opening to maintain the clamping engagement of the bolt and nut with the line and tap wires.

JOEL S. LAWSON.